(12) United States Patent
LeMole

(10) Patent No.: US 6,353,969 B1
(45) Date of Patent: Mar. 12, 2002

(54) DETENT LATCHING, BI-DIRECTIONAL STRUT WITH OFFSET HINGED INSERTS

(76) Inventor: John M. LeMole, 354 Broadway, Rockland, ME (US) 04841

( * ) Notice: Subject to any disclaimer, the term of this patent is extended or adjusted under 35 U.S.C. 154(b) by 0 days.

(21) Appl. No.: 09/190,350

(22) Filed: Nov. 12, 1998

(51) Int. Cl.[7] .......................... F16C 11/10; B63B 17/00
(52) U.S. Cl. ..................... 16/352; 403/102; 403/161; 114/361
(58) Field of Search .................. 16/352; 403/102, 403/161, 157, 101; 5/121, 113, 99.1; 114/361

(56) References Cited

U.S. PATENT DOCUMENTS

| | | | | |
|---|---|---|---|---|
| 1,036,222 A | * | 1/1912 | Bolin et al. ................. | 403/102 |
| 1,906,218 A | * | 4/1933 | Patchell ...................... | 403/102 |
| 4,865,064 A | * | 9/1989 | Parsons et al. ............. | 403/102 |
| 5,178,583 A | * | 1/1993 | Rankin ....................... | 403/102 |
| 5,217,315 A | * | 6/1993 | Rosane ....................... | 403/102 |
| 5,431,508 A | * | 7/1995 | Kitamura .................... | 403/325 |
| 5,743,208 A | * | 4/1998 | Miller ......................... | 114/361 |
| 5,803,104 A | * | 9/1998 | Pollen ........................ | 114/361 |

* cited by examiner

*Primary Examiner*—Anthony Knight
*Assistant Examiner*—E Peavey
(74) *Attorney, Agent, or Firm*—Stan Jones, Patents

(57) ABSTRACT

An articulating strut capable of assuming an extended in-line and a folded configuration with rigid cylindrical tubing having proximate ends configured to fixably receive an offset hinged insert that provides for folding and unfolding of said strut. When fully unfolded the strut acts as a single rigid structural support member held in the locked position by a bi-directional slidable locking sleeve. The hinged insert has full faced load bearing surfaces which together with offset hinge pins tends to direct the strut members under compression to assume an over-center locked position. Such struts have particular application as bimini or dodger marine coverings that fold or become taut without tensioning straps or supporting tension in the covering material itself.

17 Claims, 6 Drawing Sheets

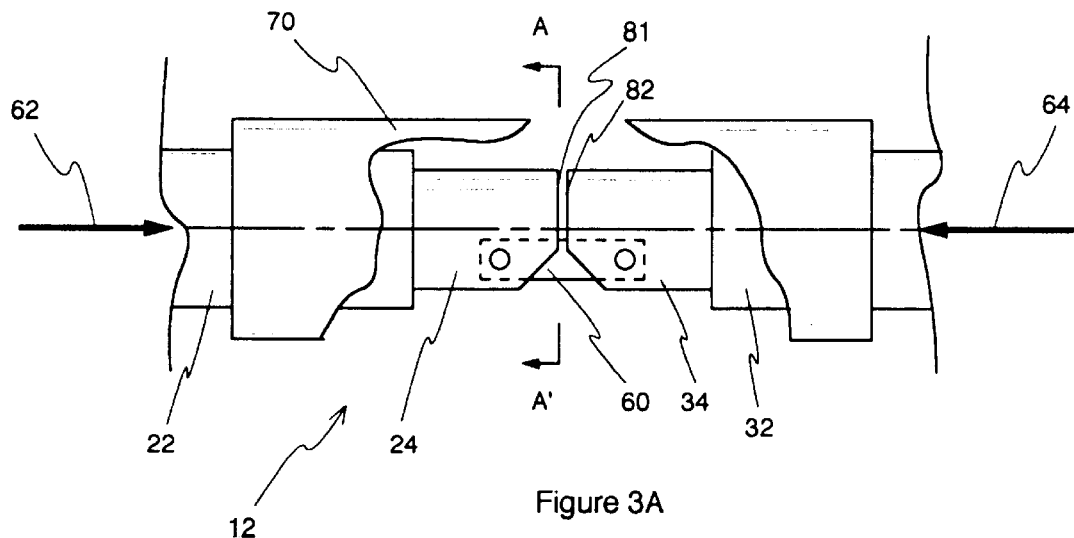
Figure 3A
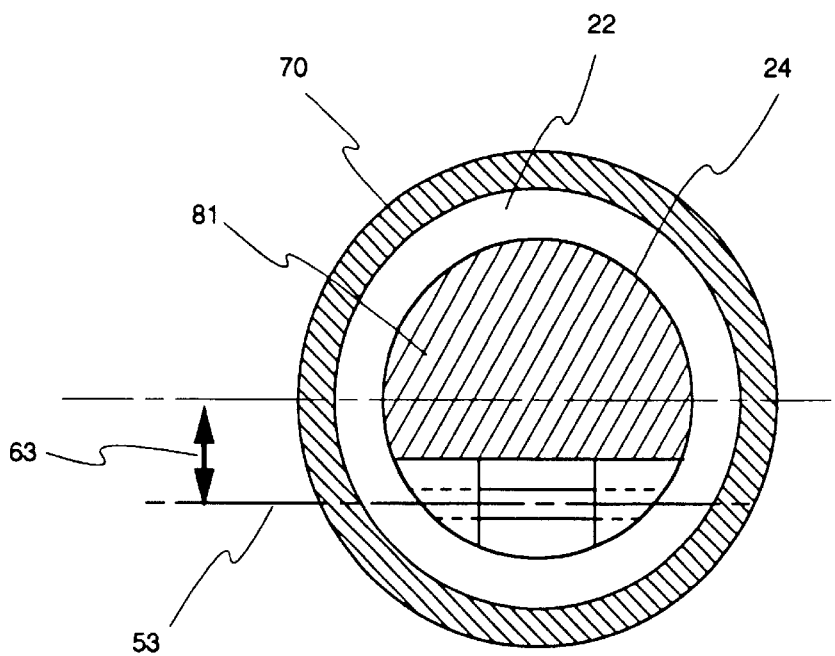
Figure 3B
Figure 3

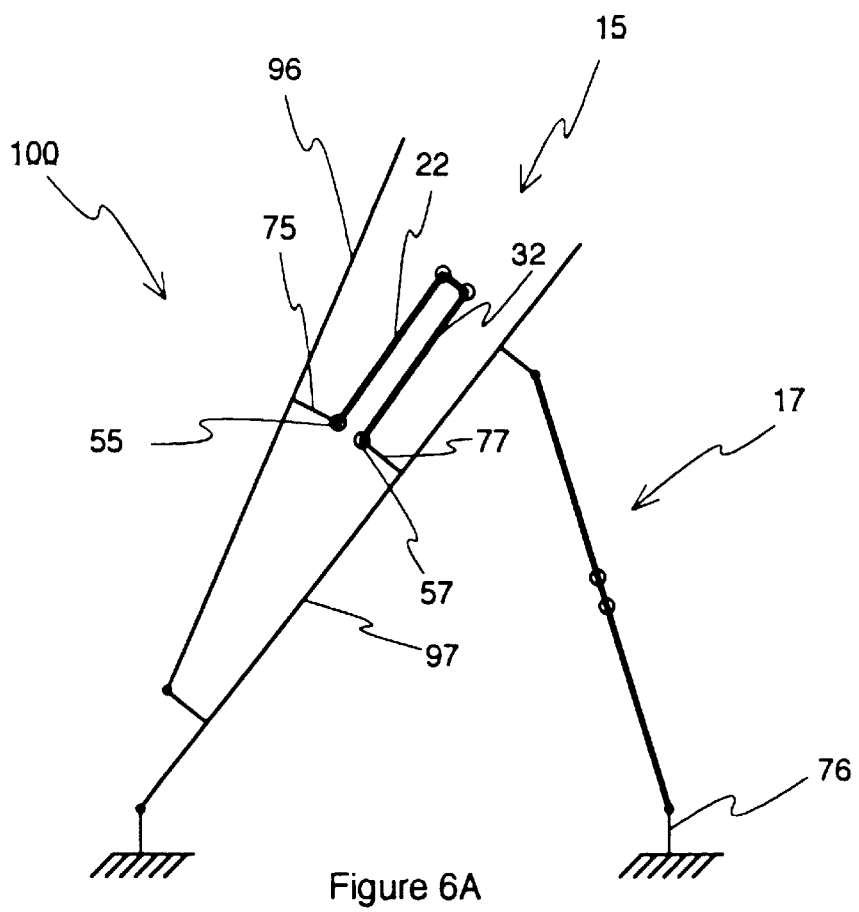
Figure 6A
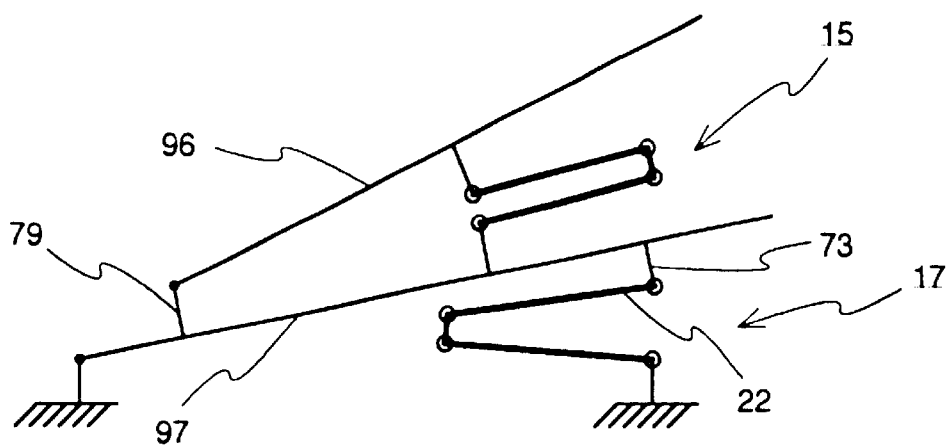
Figure 6B
Figure 6

DETENT LATCHING, BI-DIRECTIONAL STRUT WITH OFFSET HINGED INSERTS

FIELD OF THE INVENTION

The present invention relates to an articulating strut support strength member. More particularly, the field of this invention relates to a support member used in—but not limited to—the flexible coverings field with particular emphasis on marine canvas, vinyl and similar synthetic materials.

Additionally the field relates to an articulating knuckle insert compatible with industry standard marine grade structural tubing. Further, my field of invention relates to a knuckle insert which is shop fabricated for field installation within existing rigid support tubing as found, for example on boats, tents, temporary buildings and the like.

Explanation of Terms

Certain terms are used to introduce and explain the background of the art and the invention; and, for convenience and completeness sake, such terms are summarized in this section. These terms are not meant to supersede the claims nor the definition of terms as defined within the four corners of the specification; but, rather, are meant to further the understanding of the invention and briefly introduce the technical art stage for a detailed teaching of the improvement in the art as provided by this invention as claimed.

Locking Sleeve

A slidable tubular sleeve of an internal diameter a few thousands of an inch or so larger than the external diameter of its strut member counterparts. In most applications, such a sleeve has a mating configuration to the framework tubing—with such tubing often being cylindrical or box shaped in nature.

Latching Detents

Spring loaded balls which protrude partially through holes in each half, or sectional member, of a support strut. These detents retain the locking sleeve in place over an articulating bridge, thus locking the strut in an extended and taut position.

Articulating Bridge

A short, relieved and shaped, generally rectangular bridge which is hinge-pin connected at each end to identical, opposed image socket insert hubs. This articulating bridge, in concert with flat-faced mating socket hubs, create a double knuckle two axis, folding joint. An underneath section of this bridge is relieved sufficiently to provide rotation in excess of 90 degrees at each end. Such over 90 configuration provides additional freedoms of motion improving field installation flexibility in that outboard pivot point locations are less critical during field installations.

Insert (Sometimes Called Anchor Insert Hubs)

Relieved and shaped, but generally cylindrical, hubs of a snug fit diameter which are inserted into and fixed by pins to one member of a folding two member strut. Such hubs receive and house the ends of a bridge cross piece and provide folding capability for the joined strut sections.

On the folding part of my strut, these inserts are flat faced and when butted together one against the other act as load bearing surfaces for increased strut strength and rigidity.

Folding Strut

In mechanical terms, a strut is a brace fitted into a framework to add strength and rigidity. For this invention the term strut is generalized to include both structural halves or legs of a rigid tubing strength member. It further includes a center insert which includes a double knuckle geometry allowing the two halves of the strut to fold upon itself, in one direction, or unfold to a perfectly straight configuration.

Such a locked strut becomes a single rigid structural support member with improved compressive holding strength by virtue of a bridge and "flat-faced" inserts. That single strut member, in turn, often locks other struts or separate articulating framework members in place.

Axes of Rotation

Within the framework of this invention there are two axes of rotation within the double knuckle insert of the folding strut. In usage my folding strut cooperates with two additional axes of rotation at the outboard ends of the two strut halves. These outboard axes of rotation, or pivot points, are also the structural connecting points to a collapsible, skeletal framework. When a folding strut is extended and sleeve locked, both outboard axes of rotation become fixed by virtue of triangular geometry. The two axes within the double knuckle, and the outboard pivot points all rotate within the same plane.

Collapsible Covering

A generic term which includes bimini tops, dodgers, and other stretched coverings usually but not limited to weather exposed marine applications. A covering which by design is taut when fixed in place over a rigid framework, generally of cylindrical tubing construction.

Such a framework in marine applications is often pinned for a forward collapsing, articulating motion, and when opened, is held upward and rigid by straps in tension. This articulating framework is usually configured with one or more crossway structural bows which have been inserted through stitched sleeves in a canvas or vinyl covering.

Tension Strap

One or more generally downward and aft tending straps attached to the structural tubular framing of a Bimini Top, Dodger or Covering. With tension straps extended and secured, the covering is pulled taut and held upwardly in place to its maximum open and tautly stretched configuration.

Bimini Top

A canvas or synthetic covering stretched tautly over a skeletal framework. A temporary convertible covering usually positioned over an outside steering station on a powerboat or yacht.

Dodger

A weather covering of canvas like material stretched tautly over a curved, tubular framework on a dodger is temporary convertible covering over the forward portion of a sailboat cockpit and affording weather protection to both the steering station and the companionway entrance. Given the more limited deck space of a sailboat over a power yacht, dodgers are shaped and fitted to attempt optimization of weather protection and entrance/egress.

BACKGROUND OF THE INVENTION

Articulating struts are well known and find many uses. Often such struts are manufactured in place as part of a customized larger equipment piece. Typical examples abound in the aircraft, space and marine and recreational industry. Often such struts employ many moving parts and are unusually complex for what—on the surface or to a casual observer—is a seemingly simple and straightforward application. An aftermarket in these various technical disciplines exists, and such an aftermarket calls for prefabricated, field installation folding struts.

The marine recreation world, for example, broadly involves both sail and power boats. Such craft use canvas or synthetic fabric-covered apparatus extensively for protection from sun and rain. On power boats, these coverings are known generically as bimini tops and usually cover a substantial portion of a deck or outside steering station such as a flying bridge. Depending on weather usage preferences, these bimini tops are preferably folding and collapsible, usually in a forward direction, such that an operator may raise or lower the covering for personal preference and weather conditions.

In the sailboat world, similar but smaller coverings generically called dodgers, are used in much the same general fashion as the bimini tops on larger power boats. Sizes and shapes vary from boat to boat depending on specific boat deck designs which dictate attachment configurations.

DESCRIPTION OF PRIOR ART

Turning now to the prior art, a search has revealed various patents, several of which are only of peripheral relevance. Such patents include:

U.S. Pat. No. 4,580,829 to Metheopoulos (Apr. 8, 1986)
U.S. Pat. No. 4,819,300 to Jackson (Apr. 11, 1989)
U.S. Pat. No. 4,543,006 to Wang (Sep. 24, 1985)
U.S. Pat. No. 5,293,656 to Chan (Mar. 15, 1994)
U.S. Pat. No. 4,670,921 to Avni et al. (Jun. 9, 1987)
U.S. Pat. No. 5,745,954 to Shogan et al. (May 5, 1998)
U.S. Pat. No. 4,877,164 to Baucom (Oct. 31, 1989)

Each of these reference patents will be discussed briefly in order to point out the lack of significant relevance to this invention.

| 4,580,829 | Apr. 8, 1986 | Matheopoulos |
|---|---|---|

Matheopoulos has disclosed work in the field of vehicle visor hinging. Using cylindrical sleeved openings similar to a door hinge, Matheopoulos has detents to hold the hinged visor in one of several positions. Otherwise it is of no interest.

Matheopoulos lacks any teaching of a sliding shaft or spring loaded stop points, or longitudinally located hinge halves which fold upon themselves. Moreover, the hinge of the reference—positionally—simply can not go from straight to folded upon itself and back again.

| 4,819,300 | Apr. 11, 1989 | Jackson |
|---|---|---|

Jackson's disclosure is disclosed for interior aircraft usage such as luggage compartments. Such a disclosure, with multiple moving parts, spring/pawl-reliance for locking and/or unlocking simply would not be cost effective for the marine uses of this invention.

The Jackson strut specifically is disclosed as an automatic spring loaded—not manual—lock. Moreover, the Jackson operation even demands a full fold to a pre-determined position before it can be automatically locked. Jackson is not bidirectional. Such a device is not applicable to the harsh conditions of the marine environment.

| 4,543,006 | Sep. 24, 1986 | Wang |
|---|---|---|
| 4,877,164 | Oct. 31, 1989 | Baucom |

Wang's disclosure is in the area of providing a folding multi-position ladder hinge, with an off center pinned hinge point in order to fold a ladder. His disks 11 and 21, that actually form the hinge flanges, are integral with the rods 12 and 22 to be folded. These hinge elements are not inserted into the rods to be folded.

Wang discloses a standard type hinge mechanism. The Wang stops and detent positioning devices are for radial positioning. Baucom is discussed with the Wang patent simply because they both compare with each other in several ways but are not comparable to the invention.

| 5,293,656 | Mar. 15, 1994 | Chan |
|---|---|---|
| 5,745,954 | May 5, 1998 | Shogan et al |

The Shogan et al and Chan patents are treated together since they are slight adaptations from one another.

Both references disclose hinge techniques in the field of folding baby crib or playpen support frames. By employing an external hinge housing, two rods may be folded—but the rods do not internally house the hinge mechanism that provides a folding capability. The housings 20 and 40 of these prior art references do not move. Moreover, the hinging part of these references is a separate piece that is not, and could not, fit within the rods 21 of Chan or 22 of Shogan et al.

| 4,670,921 | Jun. 9 1987 | Avni et al |
|---|---|---|

The Avni et al disclosure, in FIGS. 1, 2 and 11 shows a straight and folded-against-itself condition for rods 17 and 18. The Avni et al wedge 29 is spring loaded and locks the poles 17 and 18 in an extended or straight position. Other than this locking wedge, however, Avni et al has little relevance to the invention.

Here presented—for the first time—is a new and improved strut having superior strength, flexibility in the field and a self supporting rigidity by use of offset hinge pins and exposed hub faces which serve several functions including acting as load bearing surfaces. A bi-directional, detent held, springless sleeve completes the structural rigidity equation, adds to the flexibility of my invention.

SUMMARY OF THE INVENTION

Briefly summarized, the folding strut of this invention includes a strong connecting link that is snugly fitted within a pair of opposed hubs, which hubs are themselves internally mounted in the ends of a pair of structural tubes or members. This two axis, pivoting link is seated in rounded cutout hub portions, and is pinned off-center, relative to the hubs. The hubs are fixed internally at the ends of a pair of opposed hollow cylindrical members, and have a face areas that are large and serve as an auxiliary load bearing surface.

Two spring-loaded detent push buttons positionally hold a slightly larger slidable sleeve in place when the tubes and sleeve are extended into a straight position. Manually depressing one or the other of the spring loaded detent buttons—and, sliding the oversized sleeve from either direction toward the hinged center—allows the strut (and thus the two tubes) to fold back upon itself.

My folding strut is readily installable into existing field tubing, and similar framework. My double knuckle is designed as a separate assembly with two identical, but opposed hub inserts having exposed load bearing faces. Such surfaces, when the strut is extended, bear against one another in compression providing increased strength and rigidity. Additionally, the two axis bridge and pin offset mechanically favors an extended configuration. Thus, such structure in combination with a bi-directional sliding locking sleeve provides a much, improved folding joint for a strut.

Further, I teach a method and apparatus for the creation and installation of a folding strut within an existing skeletal structure or framework. My novel invention mates with the same sizes and types of materials as those of typical marine coverings structures.

For example, in many marine applications, a bimini or canvas covering is provided for the outside steering station of power boat.

My hinge itself consists of two insert hubs with rounded slots milled in the opposed hubs. These slots house a central connecting bridge that has mated rounded ends pinned at offset locations such that the rounded ends of the link pivot within the hub slots as the outer strut members fold against themselves.

The internally located double knuckle allows each tube strut member to fold 90 degrees from its normal straight in-line position to a parallel side-by-side location when the strut is in a folded configuration. The hinge pins holding my bridge are offset from the strut's longitudinal axis for the improved features presented herein.

OBJECTS OF THE INVENTION

It is an object of the invention to a provide an efficient strut which may be locked with a minimum of parts.

It is an object of the invention to provide a bi-directional sliding locking sleeve over a bridged insert pair.

It is an object to provide two spring and ball detents which may be inserted independently of other strut structural elements.

It is an object of the invention to provide a pre-fabricated, field installation articulating knuckle within a length of tubing.

It is an object to provide a two point knuckle which has a freedom of motion in one plane of zero degrees when fully extended up to 180 degrees when fully folded.

It is an object of the invention to use a material for a double knuckle that is lightweight, yet structurally strong and machineable.

It is an object of this invention to provide a replacement strut assembly should a strut be damaged in use.

It is an object to provide a rigid member between two covering bows, both of which may be rotationally pinned at one end.

It is an object to provide a centrally positioned articulating knuckle which cooperates with two outboard pivot points.

It is an object to provide a knuckle with two pivot points which are constrained to articulate in only one plane.

It is an object of the invention to provide an attachment method so that two outboard ends can be rotationally attached to marine hardware.

It is an object of this invention to allow collapsing and folding without removal of canvas.

It is an object to provide a knuckle and locking sleeve which is field installation into an existing framework for a marine covering.

It is a object of the invention to provide at least a pair of horizontal, folding struts between two tubular rotatable bows.

It is an object to provide a rigid, free standing, structural framework.

BRIEF DESCRIPTION OF THE DRAWING

FIG. 3 includes FIGS. 3A and 3B which views are helpful in demonstrating the offset and load bearing face surfaces for my hub inserts. In particular FIG. 3B is an end view taken along the lines A–A' in FIG. 3A.

FIG. 4A is a side view of a prior art dodger showing the limitations of deck access. FIG. 4B is an exploded view of a typical forward bow to canvas attachment. FIG. 4C presents the prior art with a broken tension strap, thereby causing the dodger to accidently collapse.

FIG. 5A is side view of a marine dodger incorporating folding struts of my invention within its framework. FIG. 5B is a front view of the windshield section incorporating my folding struts. FIG. 5C is an enlarged detail of a connection for my strut to the top of a forward bow.

FIG. 6A is a line drawing side view presentation showing a hatch section folded and a window section extended and upright.

FIG. 6B is a line drawing, also in side view, presenting component parts of a marine dodger, with two sets of folding struts in a fully folded position.

DESCRIPTION OF EMBODIMENT(S)

Figure 1:
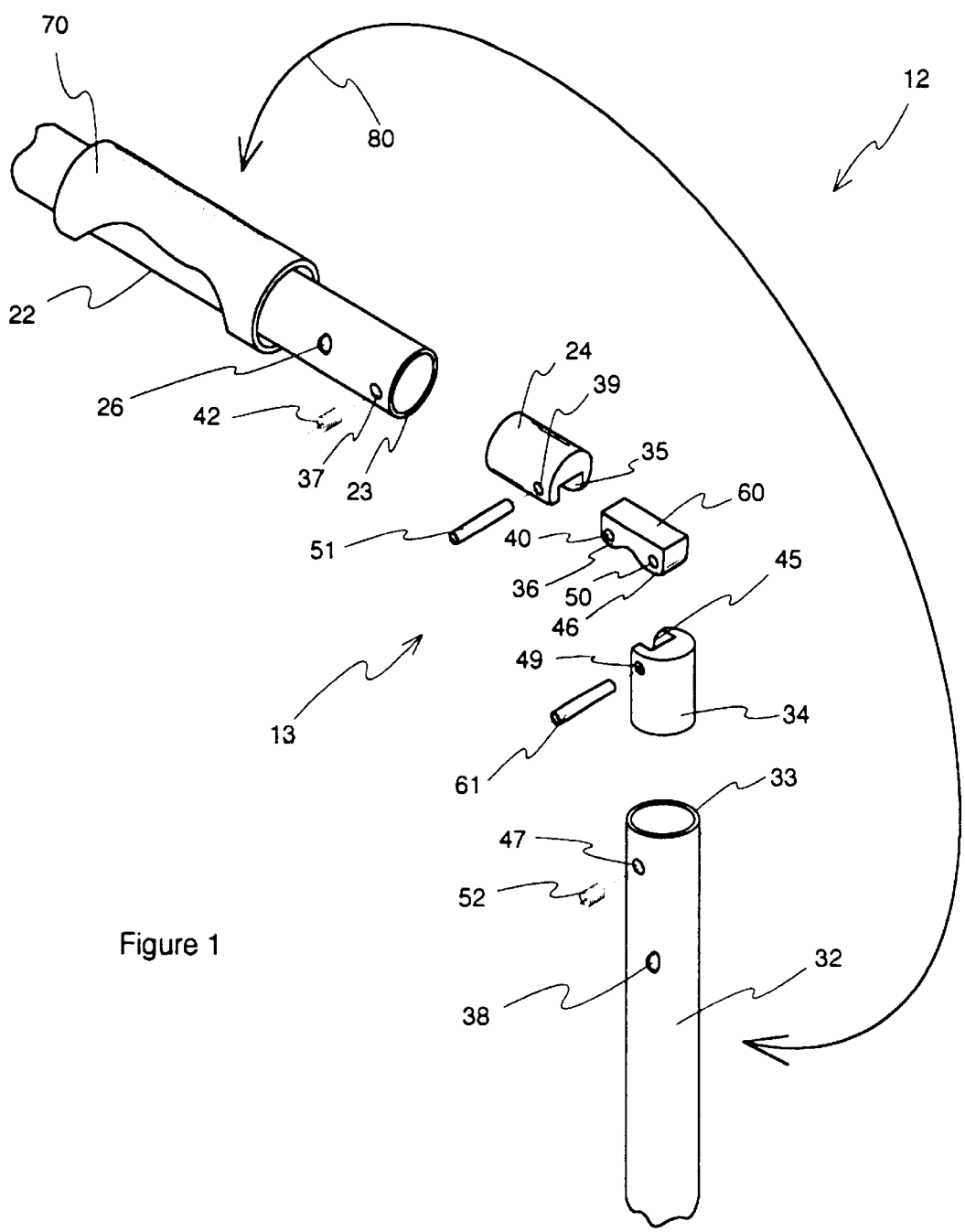
FIG. 1 is an exploded view in perspective showing the invention in a partially folded position. More specifically the strut 12 is articulated to approximately 90 degrees.

Turning now to FIG. 1, a preferred embodiment of my folding strut is shown in exploded view. For viewing clarity, strut 12 is shown unlocked, and partially folded.

Folding strut 12 is comprised of two tubular legs 22 and 32, locking sleeve 70, and double knuckle assembly 13. Although various materials may be used, in its preferred embodiment, I have found stainless steel tubing in the range of one inch outside diameter to be a good choice.

Bi-directional sleeve 70 may be positioned unlocked, as shown on leg 22, or equally so on leg 32. The articulating element of folding strut 12 is bridge insert assembly 13, which is comprised of bridge 60, and two identical but opposed hub inserts 24 and 34.

Inward, lower quadrant ends of hubs 24 and 34 are machined with guide slots 35 and 45, to receive rotatable fitted ends 36 and 46 of bridge 60. Holes 39 and 49 are drilled orthogonally through lower quadrant ends of hubs 24, and 34 with a hole centerline passing through open guide slots 35 and 45. Holes 39 and 49 are suitably reamed for a press fit with respect to roll pins 51 and 61.

Correspondingly, ends 36 and 46 of bridge 60 are drilled with holes 40 and 50 for a snug, but rotational fit with respect to roll pins 51 and 61. Thus, once bridge 60 is positioned into guide slots 35 and 45 of opposed hubs 24 and 34, and roll pins 51 and 61 are installed orthogonally through aligned, mating holes, a complete articulating bridge insert assembly 13 (shown only as an exploded view) is created.

Although a variety of different materials could be used, I have found that the synthetic material trade named Delren meets the strength and machinability requirements for bridge insert assembly 13. With bridge insert assembly 13 press-fit together, and so described, this stand alone double knuckle is easily fitted into and between inboard ends 23 and 33 of tubing legs 22 and 32. Outboard ends of hubs 24 and 34 are held in place by set screws 42 and 52.

With legs, hub inserts, roll pins, and bridge assembled as described, my strut easily articulates in a smooth manner. The strut 12 will fold back upon itself, through a range of zero (fully extended) to about 180 degrees. Arc 80 depicts the full 180 degree arc for the articulating movement of the invention.

Figures 2, 2A, 2B:
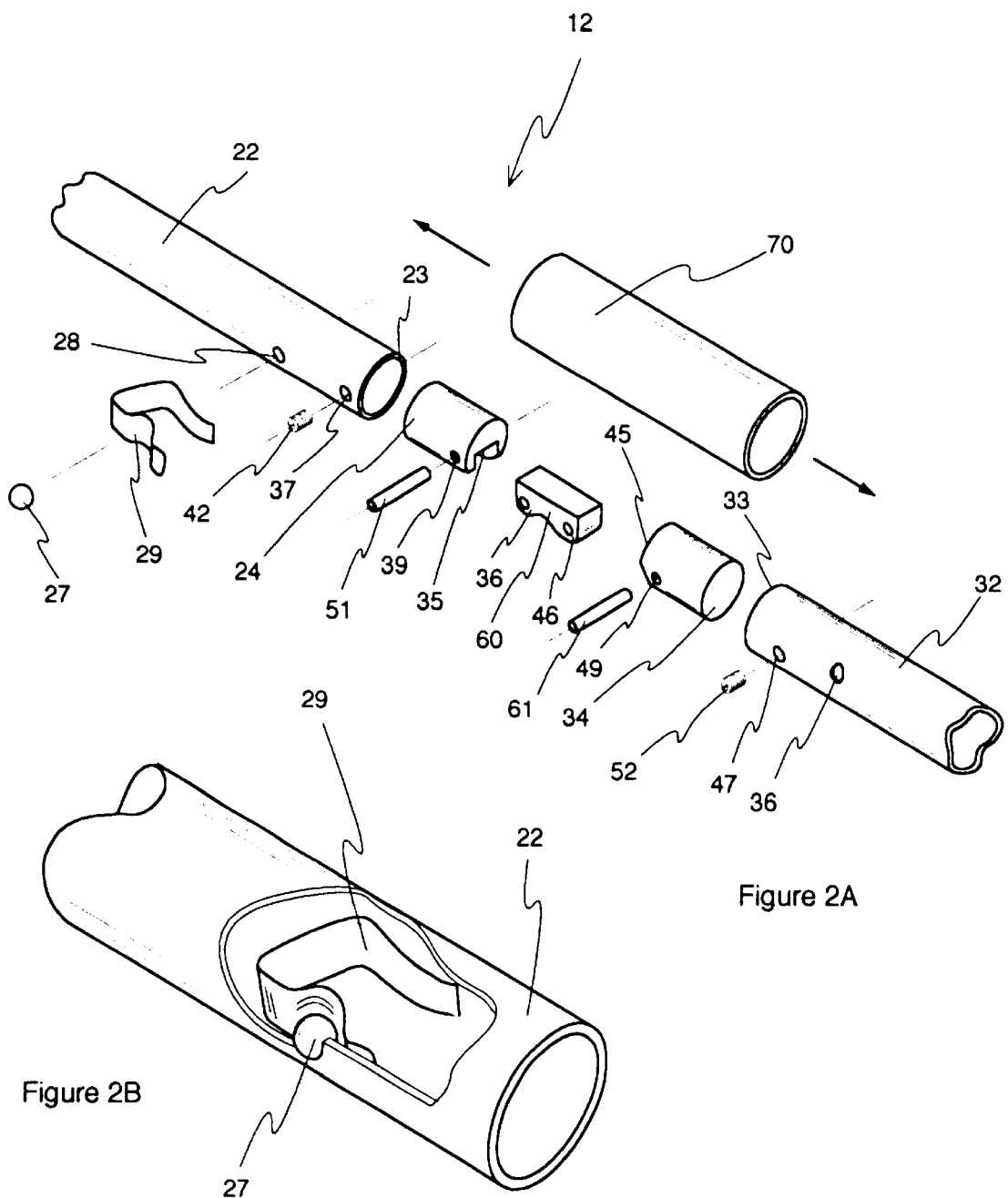
FIG. 2 is an exploded view in perspective showing an enlarged sketch of my folding strut, extended in a latching position.
FIG. 2A is a partial cut away view of a portion of one leg, showing the installation of a latching spring and detent.

Turning to FIG. 2, folding strut 12 is shown extended and in a locked position. Per FIGS. 2A and 2B, please notice that detent ball 27, held outward by spring 29, is of such diameter with respect to its viewing hole 28, that a firm thrust of sleeve 70 toward ball 27 easily retracts ball 27 allowing sleeve 70 to slide into place over inserts 24 and 34 and bridge 60 as well.

As sleeve 70 bumps second ball 36 in leg 32, first ball 27 being spring loaded, pops out behind sleeve 70, effecting in-line capture on both ends of sleeve 70, thereby positioning sleeve 70 squarely over all rotating elements of knuckle assembly 13. With sleeve 70 in place as described, strut 12, becomes a rigid structural member, capable of carrying loads in either tension or compression, without collapse.

Notice also in FIG. 2B, that ball 27 and detent spring 29 are independent of knuckle assembly 13, with both elements 27 and 29 being held in place simply by the location and diameter of hole 28 in leg 22. Hole diameter 28, FIG. 2A, is smaller than the diameter of detent ball 27. Such independent easily insertable detent elements, are combined with a pre-assembled knuckle 13 and a simple bi-directional tubular lock 70. This combination makes my folding strut uniquely amenable to field installation within existing marine covering frameworks.

Moving now to FIG. 3, a highly schematic view is shown for strut 12 in the straight and locked condition of FIG. 3A. Strut 12 is now extended, with leg 22 in line with leg 32. Hubs 24 and 34 and bridge 60 are longitudinally aligned, with butt ends 81 and 82, respectively of hubs 24 and 34 (shown slightly separated for clarity), mated to their respective flat surfaces in a straight and locked position. In FIG. 3A, for example, bridge 60 is shown schematically with a rectangular shape but the lower saddle shape of FIGS. 1 and 2 is equally suitable, and, in many cases, preferable for my invention.

In FIG. 3A, with strut 12 configured in a straight, extended position, sleeve 70 may be manually slid into place from either end so as to lock strut 12 in its extended rigid position. As best shown by the cross shading of FIG. 3B, a large percentage of inward face 81 of hub 24 is available for surface contact with the opposing face 82 of FIG. 3A.

Notice in FIG. 3A, compression forces depicted by arrows 62 and 64 are carried by the load bearing relationship of insert faces 81 and 82. Additionally, as shown in FIG. 3B, axis 53 of both bridge roll pins is positioned considerably off the longitudinal axis, as further depicted by moment arm 63. Such intentional moment arm, when subjected to compression forces 62 and 64, causes strut 12 to mechanically favor an extended position. Thus, compression loads are directed inward against the opposing and butted surfaces of faces 81 and 82.

Figure 4:
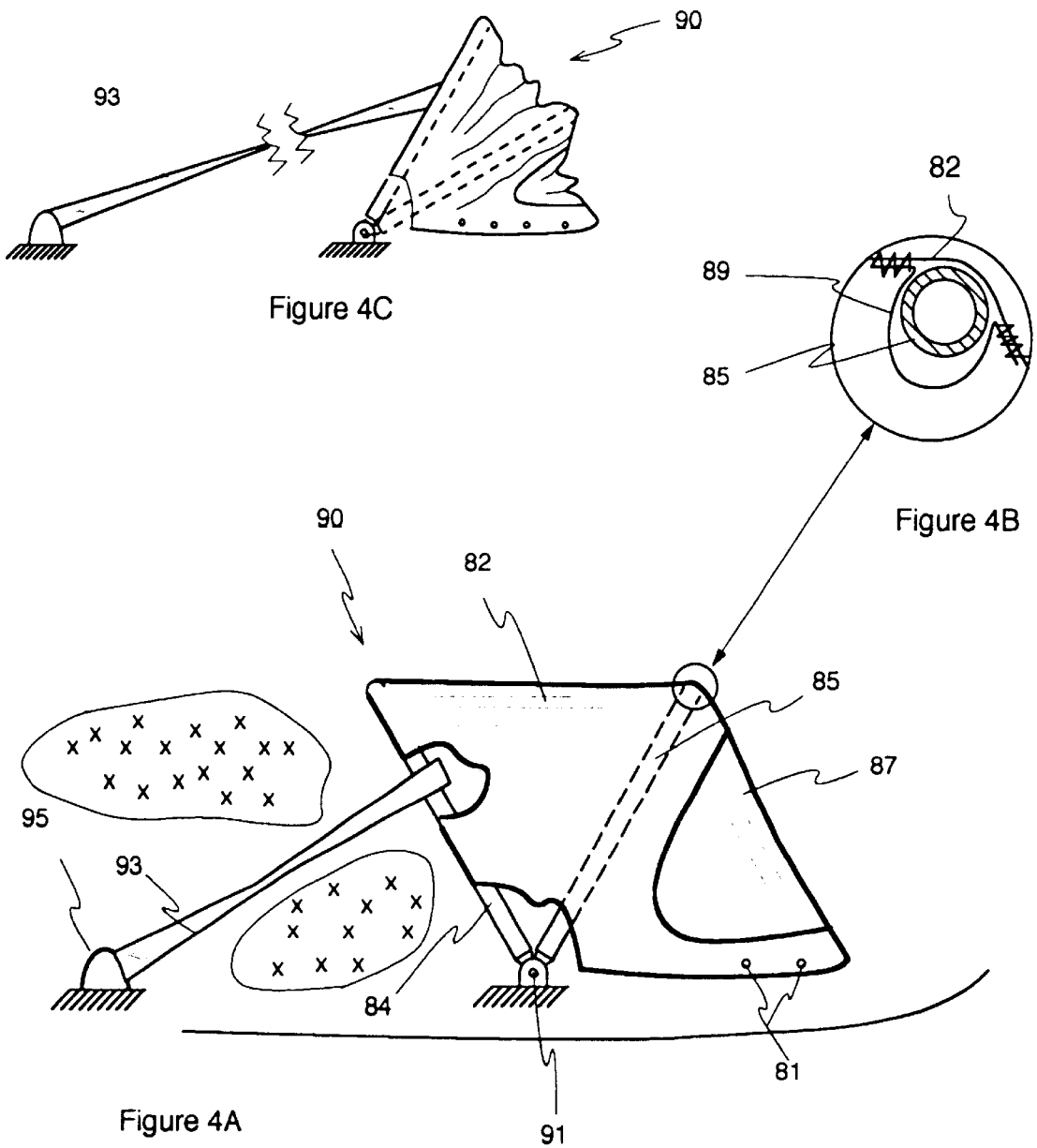
FIG. 4 is a prior art dodger and includes FIGS. 4A, 4B and 4C.

In order to better explain the marine applications of my folding strut, I have shown in FIG. 4, a marine sailboat dodger, typical of the prior art. Follow-on FIGS. 5 and 6 will comparatively explain the novel attributes of a dodger configured in accordance with my folding struts. Additional information is set forth in my recent article entitled "Twisting dodger's design", published in the *IFAI's Marine Fabricator* magazine.

Turning now to FIG. 4, the objective of the prior art is to provide a covering for inclement weather conditions, which may be folded forward when not required. Covering 82 is supported by semi-circular tubular bows 84 and 85. Such bows 84 and 85 span an entrance companionway on a boat, usually over a sliding hatch to a companionway going below, as well as affording protection from wind and rain.

Notice that bows 84 and 85 are rotationally pinned, to the vessel through a deck mounted rotation point 91. Since bows 84 and 85 are free standing with respect to rotation point 91, their only means of physical support is in tension. A continuous tension path exists via strap 93 attached to deck cleat 95, and through bow 84, canvas 82, bow 85, to deck snaps 81.

The enlarged cross-section of FIG. 4B shows yet another structural requirement of a dodger 90 supported only by inner established tension through the cover and apparatus itself. Since bow 85 is free floating for folding purposes, it must be structurally attached to canvas 82 so as to move into a functional support location when dodger 90 is raised. Thus, as shown in exploded view in FIG. 4B, an additional canvas loop 89 (or zippered sleeve) must be stitched to canvas 82.

Another inherent weakness of such a prior art tension-only configuration is shown in FIG. 4C. Should strap 93 fail, the entire dodger 90 collapses in an uncontrolled fashion. An additional drawback is shown by FIG. 4A. Please Note that the presence of the strap 93 is a direct hindrance to access from the cockpit of a vessel to the narrow decks typical of sailboats. The—XXX's—in FIG. 4A delineate significant areas that block freedom of movement in the prior art.

A further drawback of the prior art may be appreciated when one notes that only tension is involved in keeping the fabric upright. The bow framework, held only by stretching fabric 82 is not rigid and does not offer any significant support. A sailor who accidently places a portion of his weight against tension strip 93 could easily cause a failure of the dodger 90. Furthermore, the entire unit may collapse uncontrollably as depicted in FIG. 4C.

Such a prior art apparatus under tension is fraught with many limitations and short comings which are all overcome when my locking strut 12 is incorporated into, for example, the structural skeleton of a dodger or bimini top. These features will become more evident as my preferred embodiment is described more in connection with FIGS. 5 and 6.

Figure 5:
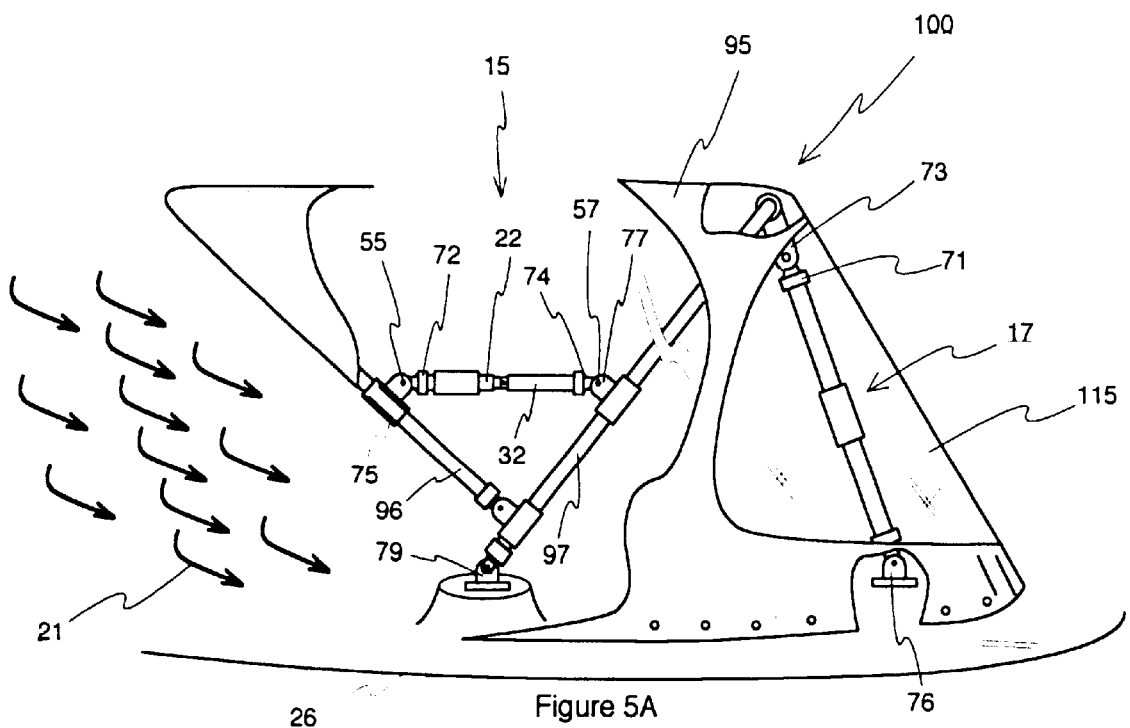
FIG. 5 includes FIGS. 5A, 5B and 5C. In particular
Figure 5:
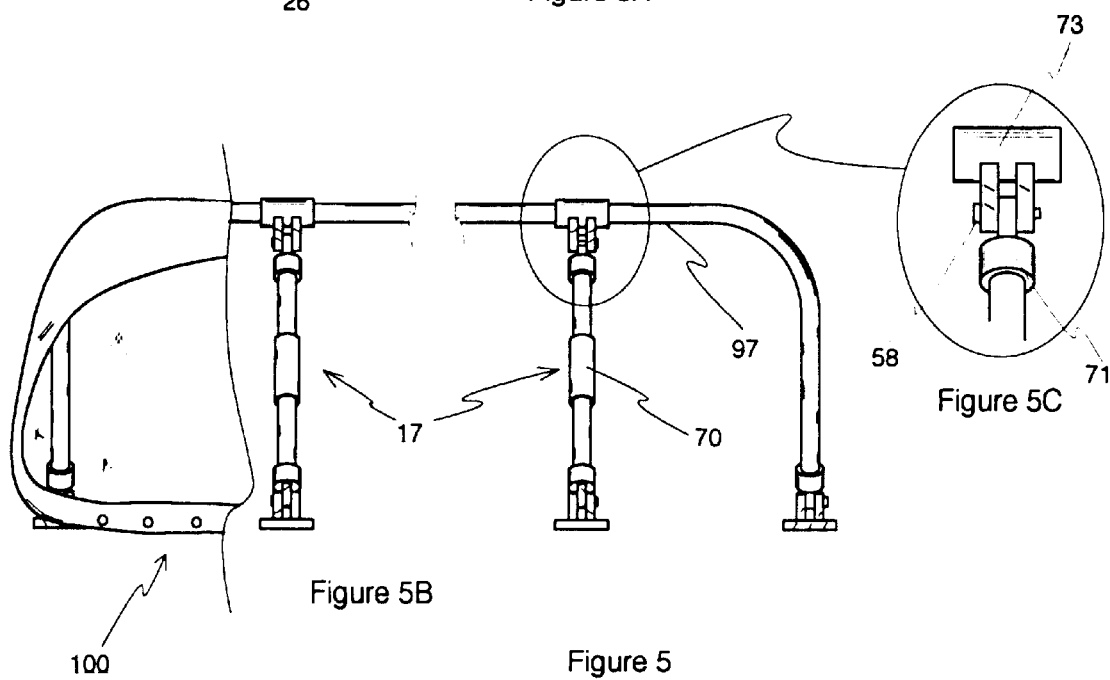

Turning now to FIG. 5, my struts 15 and 17 are shown integrated within the structural framework of a typical marine dodger in its preferred embodiment. With struts 15 and 17 so positioned, bows 96 and 97 are held rigidly in their preferred upright positions. Note, that bows 96 and 97 when configured with struts 15 and 17 become a rigid framework, firmly affixed to the vessel. Thus, the combination thereof is free standing, and self supporting, and does not require any external straps.

As shown in FIG. 5A, the result of this internally supported and free standing structure, is that large areas of entrance and egress from cockpit to deck are created (designated by arrows 21) in contradiction to the prior art limitation wherein such areas were blocked.

In FIG. 5A, strut 15 is shown in side view between bows 96 and 97. A second, and matching configuration strut 15 is typically positioned on the opposite side of a two bow dodger assembly 100. At each bottom side of dodger assembly 100, common deck attachment receiving jaws 79 pin the two bow dodger assembly 100 to a vessel via deck pedestal 26.

Continuing with FIGS. 5A and 5B, struts 15 are positioned generally horizontally between dodger bows 96 and 97 across the triangular truss above pedestal 26. Struts 17, on the other hand, are positioned between an upper flattened section of bow 97 and a deck mounted receiving jaw 76. FIG. 5B. Struts 17 tend toward the vertical at about a thirty degree angle or so as shown by the side view of FIG. 5A. (Although shown attached to the tops of forward bow 97, the forward struts 17 may also be attached to the sides of the forward bows above or below the attachment points of the side center struts.)

Bow 97 will remain in an upright position and thereby provide an upright windshield support irrespective of the status of strut 15. Thus, the aft portion of the covering 95—between bows 96 and 97—may safely be folded into a forward position and clear the way for ease of entrance into a hatch or galley.

Legs 22 and 32 of strut 17 are fitted with rigidly attached end cap eyes 71 and 73 typical of those shown in FIG. 5C. Attachment elements 71 and 73 are match drilled and fitted with pivot pin 58, thus providing outboard pivot points for each of the folding struts 17.

My strut invention in a new and improved dodger configuration leaves the windshield in a rigid up position. Additionally, of course, my dodger assembly 100 also includes the feature of a folding windshield. In either configuration, however, my struts become the only support members required to maintain the dodger in an upright, partially or fully folded condition.

For clarity of operation, following the above explanation of FIG. 5, I have included line drawing schematic representations of FIGS. 6A and 6B to further delineate the dodger folding modes provided by my strut invention. Comparison of the numbered elements of FIG. 5 with those of FIG. 6A will readily reveal that struts and bows are similarly positioned and numbered.

Thus, in FIG. 6A, strut 15 is attached between bows 96 and 97, while strut 17 is installed between bow 97 and a fixed, receiving jaw 76. Both struts 15 and 17 are shown optionally, and for clarity attached to the vertical sides of bows 96 and 97. (In each case, struts 15 and 17 would, in actual practice, be matched by identical struts on the opposite sides of bows 96 and 97.)

Extrapolating from FIG. 5, locking sleeves 70 have been slid on to either of strut legs 22 or 32 allowing strut 15 to fold upward as depicted by the line schematic in FIG. 6A. Simultaneously, legs 22 and 32 of strut 15 rotate around outboard pivot pins 55 and 57 creating the desired folding action within a single side plane.

Given that jaw 75 is fixed to a section of bow 96, and that bow 96 is also rotationally pinned at 55, bow 96, by geometry, folds forward under the guidance of folding strut 15. In such a forward folded configuration, the remainder of dodger 100 including bow 97 is maintained as a functional rigid structure by my struts 17.

This unique one-section-only folded configuration as shown in FIG. 6A, conveniently clears a hatch while leaving a windshield support structure (as shown and described previously in FIG. 5) in a preferred structurally rigid and upright position. This is a highly advantageous feature which the prior art cannot offer.

Additionally strut 15, folded in its upward direction also helps support the gatherings of an aft section of canvas on either side. Such selective folding enhances windshield visibility and presents another valuable feature of my invention.

Moving on to FIG. 6B, struts 17 are now shown folded. Leg 22 of strut 17 is rotationally attached to jaw 73 which is in fixed communication with bow 97. Thus, the windshield section of bow 97 has now folded downward, also carrying the previously folded hatch section downward also. Notice in FIG. 6B, that strut 17 is folded inward, and in a direction opposite to strut 15. In the case of a windshield section, such a direction causes minimal interference with a folding clear windshield section.

In summary, FIGS. 6A and 6B present fixed, but folding, windshield options with folded hatch options. These features cannot be accomplished by the tension-supported prior art. Lastly, with my self-supporting strut system, and dodger skeleton, a canvas may be snap configured such that no center bow attaching loops are required. Thus, in longer periods of good weather the canvas can be easily unsnapped and stored, again unlike the prior art.

While my invention has been described with reference to a particular example of a preferred embodiment, it is my intention to cover all modifications and equivalents within the scope of the following claims. It is therefore requested that the following claims, which define my invention, be given a liberal interpretation which is within the spirit and scope of my contribution to this strut and marine covering art.

What is claimed is:

1. An articulating strut for coverings having an attachable strut-securing fixture at each end of said strut for securing said strut between two fixed points, said strut exhibits, when extended, a central longitudinal axis lying on the center line of a longitudinal center line plane, and said strut also having a folding plane orthogonally located relative to said center line plane, said strut being manually collapsible between said fixed points in adverse weather conditions and comprising:

a pair of stiff tubular strut members consisting of two hollow rigid cylindrical tubes having proximate ends;

said tubular member pair adapted at each remote end for connection to strut-securing fixtures of a covering of which said strut is an integral part;

a pair of identical but opposed hub inserts that are fixably insertible into said proximate hollow ends of said tubular members, which hub inserts on the inboard ends thereof each have partially relieved in the lower portion thereof a bridge rotation slot longitudinally positioned essentially from about the center line of each hub through the lowermost surface of the hub insert with the upper portion of said inboard ends of said hubs being non-relieved;

a bridge cross piece rotatably set into said bridge rotation slots, said cross piece having two orthogonal pin receiving holes, which holes are offset below the centerline of said longitudinal axis;

hinge pin means orthogonal to and also offset from said longitudinal axis for securing said bridge cross piece to said insert hubs for an arc rotation in said folding plane from 0 to 180 degrees only, thus permitting said tubular members to extend from a folded position of 180 degrees into a straight position of 0 degrees causing the inboard non-relieved faces of said inserts to be in face-to-face contact with each other;

a freely slidable bi-directional sleeve which is non-removable from said strut but which may be manually slid from either direction along said tubular members toward or away from said strut-securing fixtures to either lock same as an extended strut for deployment of said covering or to permit said strut to fold for collapse of said covering;

each tube having located therein detent balls that are spring loaded upwardly beyond the ends of said sleeve for holding said sliding sleeve in locked position over said folding cross bridge piece when said strut is in an extended in-line configuration;

said detent balls being manually depressible thus permitting said bi-directional sleeve to slide from either direction in order to unlock said bridge piece and thus allow said strut to fold back upon itself while said strut remains fixed at each end; and said hub inserts being further characterized in that each inboard end is a flat face having surface areas which cover a majority of the inboard flat face ends of said hubs and which bear against each other when said strut is extended in order to serve as an extending stop limit and as flat load bearing surfaces which, together with a moment couple geometrically favor an extended position for said strut thereby providing increased strength and strut rigidity for said covering when same is deployed.

2. An articulating strut in accordance with claim 1 and said strut further comprises;

a generally rectangular shape having rounded rotation corners for said bridge on the folding side of said hinge; and a folding space formed between said rounded rotation corners for housing said tube ends when said strut is fully folded, said space being large enough to allow the folded members to move back and forth thus accommodating slightly unequal tube lengths for field installations.

3. An articulating strut in accordance with claim 1 wherein said strut has a pair of ends remote from said bridge with each remote end being fitted with end caps for a single plane pivoting connection at strut-securing fixtures, said strut further comprising:

a collection of tubular bows creating a structural skeleton over which is stretched a form fitting weather protective covering for a small marine craft;

a windshield and an aft deck covering formed by said tubular bows; and said pivoting connections of said strut further comprising receiving jaws and cap eye attachment fixtures forming pivotable attachment points for connecting remote ends of said folding strut in said structural skeleton; and said struts together with said bi-directional sleeves permitting said covering to be folded either with said windshield up in place or with said windshield and said deck covering foldable to the deck of said craft.

4. An articulating strut having an extended in-line and a folded configuration in accordance with claim 1 and further comprising in said plane:

at one or the other of the remote ends of said strut, means providing at least one additional direction of freedom of motion for said strut.

5. An articulating strut in accordance with claim 1 and further comprising in said plane:

attachment means at the remote ends of said strut providing a pair of additional freedoms of motion which are variable in direction and dependent upon the geometric position of said strut and the intended strut folding function.

6. An articulating strut in combination with a small marine craft skeleton, said combination capable of assuming a deployed and a folded configuration, said strut having a central longitudinal axis and a single folding plane, said combination comprising:

structural members of rigid cylindrical tubing which may be configured either as unfolded/locked or as folded/unlocked for an arc rotation in said single folding plane from 0 to 180 degrees only;

hinge means fixably inserted in the proximate ends of said strut members with said hinge means being offset from said longitudinal axis and located below face to face extending. limit and load-bearing contact at the inboard ends of said offset hinge means;

a manually slidable bi-directional locking sleeve for said strut adapted to manually move over the complete hinge means for locking purposes;

strut-securing fixtures attached at each end of said struts which form part of a craft covering skeleton for said marine craft;

said locking sleeve being freely slidable manually from either direction along said structural members toward or away from said strut-securing fixtures to either lock same as an extended strut or to permit said strut and thus said skeleton to fold collapse of said marine vessel covering;

each structural members having located therein detent balls that are spring loaded and upwardly positioned at the ends of said locking sleeve for holding said locking sleeve in position over said folding cross bridge piece when said strut is in an extended in-line configuration;

said detent balls being manually depressible thus permitting said bi-directional sleeve to slide from either direction in order to allow said strut to fold back upon itself; and said strut, when in a fully unfolded and locked configuration, becoming a single rigid structural support member with rigidity provided by said bidirectional locking sleeve and said face to face load-bearing contact at the inboard ends of said offset hinge means.

7. An articulating strut in accordance with claim 6 and having a pair of ends, one end each of said pair being remote from said hinge means, and said strut further comprising:

means connecting said strut at said remote ends to a covering framework such that said strut forms part of said framework; and manual unlocking means capable of either simultaneously folding part of said framework to a desired folded position or raising same to a taut upward position free of any supporting tension in said covering or external straps connected to said framework.

8. An articulating strut in accordance with claim 7, wherein said covering is at least a two bow covering for a small water craft, and further comprising:

a first and second or more bows forming the framework for weather protective covering over a hatch area for said small water craft; and a pair(s) of struts incorporated in said framework, one strut each on each side of said hatch area such that, when said struts are in an unlocked position, one or more bows of said covering may be folded independently of the other bows.

9. Apparatus in accordance with claim 8 and further comprising:

one bow as an aft bow and other bow as a forward bow, with said bows pinned together so as to form a triangular shape between the pinned bows, with said bows defining a windshield frame area and a hatch cover;

said pair of struts positioned essentially horizontally and joining said two bows together across said triangular shape.

10. Apparatus in accordance with claim 9 and further comprising:

such struts when unfolded allowing the user to fold the hatch portion of said covering into a chosen forward, folded position.

11. Apparatus in accordance with claim 10 and further comprising:

said forward bow forms an forward windshield brace; and another pair of off-vertical struts connected between the bow of the craft and the forward bow in order to define a rigid windshield area for said covering.

12. Apparatus in accordance with claim 11 and further comprising:

said partially folded covering allows the first bow to fold forward while said rigid windshield remains upright free of any tension straps or supporting tension in said canvas or canvas-like covering.

13. A method of field installing an articulating strut having a longitudinal axis and a single folding and extending plane, said method comprising the steps of:

cutting, from tubing typical of existing weatherproof covering framework, a pair of tubular members having proximate ends;

inserting a detent ball and a companion keeper spring in each end of the cut tubular members, with one ball/spring for each detent;

selecting a pre-assembled, double knuckle for insertion into said cut tubular members, which double knuckle is hinged for rotation in said folding plane by hinge pins that are located off axis;

inserting said double knuckle into the proximate ends of said strut members to allow for folding and/or unfolding of said strut in a single plane between 0 and 180 degrees only;

adapting said hinged double knuckle with a predetermined face to face load-bearing contact at the inboard ends to act both as an arc-limiting stop when the strut members are in line and to increase the strength and rigidity in said strut when said strut is in said in line extended position and said face-to face contact at said inboard ends increases the amount of compressive loading to which said strut may be subjected; and sliding over said double knuckle a single bi-directional sleeve that fully covers said hinged double knuckle when locked and held in position by said one each ball and detent keeper springs in said strut members.

14. A method of incorporating said strut of claim 13 in a small craft weather covering having a hatch cover area and a windshield area, and comprising the further steps of:

arranging said strut with a pair of remote coupling ends, one each remote from said hinge means, which coupling ends are available for connection to other covering framework members;

connecting said strut at said remote ends as supporting struts for a small water craft covering; and selectively folding part of said small craft covering to a folded forward position independently of the upright or folded condition for the remainder of said covering.

15. A method in accordance with claim 14 wherein said weather covering is at least a two bow covering, and said method further comprising the additional steps of:

manually raising said weather covering to a taut upward position free of any supporting tension within the covering material or any external tension straps; and holding said covering in said upward position by locking said supporting struts.

16. A method in accordance with claim 15 and further comprising the additional steps of:

placing one bow aft and another bow forward of a cockpit area on said small craft;

pining said bows together so as to essentially form a triangular bow shape supporting structure including said supporting struts and having a windshield associated with said forward bow;

horizontally mounting, essentially across said triangular bow structure, one strut each of said struts on opposite sides of said covering framework; and joining said supporting struts across said triangular bow shaped area so that the bows may fold when said struts are unlocked.

17. A method in accordance with claim 16 and further comprising the additional steps of:

adapting a multi bow covering for a small water craft into a free standing covering in which the hatch area may be folded while the windshield are remains upright; and equipping each of said supporting struts with a bi-directional sleeve adapted to slide from either direction over said hinge means.

* * * * *